US008352997B2

(12) United States Patent
Ospalik et al.

(10) Patent No.: US 8,352,997 B2
(45) Date of Patent: Jan. 8, 2013

(54) SYSTEM AND METHOD OF MONITORING BLACKOUT EVENTS

(75) Inventors: Kenneth Ospalik, Plainfield, IL (US); Daniel Malee, Wheaton, IL (US); John Mathew, Mount Prospect, IL (US); Marisa Earnshaw, Naugatuck, CT (US); Giya Tektumanidze, Riverwoods, IL (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 812 days.

(21) Appl. No.: 12/271,345

(22) Filed: Nov. 14, 2008

(65) Prior Publication Data

US 2010/0125865 A1    May 20, 2010

(51) Int. Cl.
*H04N 7/173* (2011.01)

(52) U.S. Cl. ............. 725/116; 725/32; 725/34; 725/35; 725/36; 725/46; 725/93; 725/114; 725/136; 725/144; 725/146

(58) Field of Classification Search ............. 725/32, 725/34–36, 46, 93, 114, 116, 136, 139, 144, 725/146

See application file for complete search history.

(56) References Cited

U.S. PATENT DOCUMENTS

| 5,036,537 | A | * | 7/1991 | Jeffers et al. ............ 380/241 |
|---|---|---|---|---|
| 5,416,508 | A | | 5/1995 | Sakuma et al. |
| 5,506,904 | A | | 4/1996 | Sheldrick et al. |
| 6,157,719 | A | | 12/2000 | Wasilewski et al. |
| 6,198,906 | B1 | | 3/2001 | Boetje et al. |
| 6,442,755 | B1 | | 8/2002 | Lemmons et al. |
| 6,766,169 | B2 | | 7/2004 | Cooper |
| 6,772,435 | B1 | | 8/2004 | Thexton et al. |
| 6,898,762 | B2 | | 5/2005 | Ellis et al. |
| 6,993,782 | B1 | | 1/2006 | Newberry et al. |
| 7,305,357 | B2 | | 12/2007 | Hamilton |
| 7,370,343 | B1 | * | 5/2008 | Ellis ............................ 725/58 |
| 7,530,085 | B2 | | 5/2009 | Tsuria et al. |
| 8,011,012 | B2 | * | 8/2011 | Carle et al. ................ 726/27 |
| 2002/0044658 | A1 | | 4/2002 | Wasilewski et al. |
| 2003/0018977 | A1 | | 1/2003 | McKenna |
| 2003/0126594 | A1 | * | 7/2003 | Tsuria et al. ................ 725/25 |
| 2003/0154242 | A1 | | 8/2003 | Hayes et al. |
| 2003/0220100 | A1 | | 11/2003 | McElhatten et al. |
| 2004/0244058 | A1 | | 12/2004 | Carlucci et al. |
| 2004/0250295 | A1 | | 12/2004 | Lesenne et al. |
| 2004/0261099 | A1 | | 12/2004 | Durden et al. |
| 2005/0251843 | A1 | * | 11/2005 | Walker ......................... 725/117 |
| 2006/0080198 | A1 | | 4/2006 | Doyle |
| 2006/0116918 | A1 | | 6/2006 | Flora et al. |

(Continued)

OTHER PUBLICATIONS

Lee Chow, System and Method of Restricting Access to Media Content, Nov. 1, 2007, (32 pages).

(Continued)

*Primary Examiner* — Jason Salce
(74) *Attorney, Agent, or Firm* — Toler Law Group, PC

(57) ABSTRACT

Systems and methods of monitoring blackout events are provided. A particular method includes receiving a server blackout event associated with a scheduled blackout of a first media service. The method also includes receiving at least one client blackout event from at least one set top box (STB) affected by the scheduled blackout. For example, the server blackout event and the client blackout event(s) may be received at a subscriber event transmission interface (SETI). The method further includes storing the server blackout event and the client blackout event(s) at a data warehouse.

26 Claims, 6 Drawing Sheets

U.S. PATENT DOCUMENTS

| | | | |
|---|---|---|---|
| 2006/0171390 | A1 | 8/2006 | La Joie |
| 2007/0011702 | A1 | 1/2007 | Vaysman |
| 2007/0044133 | A1* | 2/2007 | Hodecker ............... 725/117 |
| 2007/0124750 | A1 | 5/2007 | Sisodia et al. |
| 2007/0124760 | A1 | 5/2007 | Novak et al. |
| 2007/0157220 | A1 | 7/2007 | Cordray et al. |
| 2007/0198839 | A1 | 8/2007 | Carle et al. |
| 2007/0226765 | A1* | 9/2007 | Bahnck et al. ............ 725/63 |
| 2007/0266396 | A1 | 11/2007 | Estermann |
| 2007/0291944 | A1 | 12/2007 | Wingert et al. |
| 2008/0066095 | A1* | 3/2008 | Reinoso ................ 725/28 |
| 2008/0066103 | A1 | 3/2008 | Ellis et al. |
| 2008/0163304 | A1 | 7/2008 | Ellis |
| 2008/0168487 | A1 | 7/2008 | Chow et al. |
| 2008/0256569 | A1 | 10/2008 | Rhoades |
| 2009/0064188 | A1 | 3/2009 | Ospalik et al. |
| 2009/0187938 | A1* | 7/2009 | de Heer et al. ............ 725/34 |
| 2010/0083301 | A1* | 4/2010 | Swenson .............. 725/28 |

OTHER PUBLICATIONS

Kenneth Ospalik, System and Method of Verifying a Video Blackout Event, Aug. 27, 2007, (25 pages).

"Blackout (broadcasting)," Wikipedia, <http://en.wikipedia.org/w/index.php?title=Blackout_%28broadcasting%29>, modified Feb. 5, 2007, 3 pages.

"Blackout Information," DIRECTV—NFL SUNDAY TICKET Blackouts, <http://www.directv.com/DTVAPP/global/contentPage.jsp?assetId=900046>, retrieved Feb. 16, 2007, 2 pages.

"Syndication exclusivity," Wikipedia, <http://en.wikipedia.org/w/index.php?title=Syndication_exclusivity>, modified Jan. 17, 2007, 3 pages.

Non-Final Office Action for U.S. Appl. No. 11/786,030 received from the United States Patent and Trademark Office (USPTO) mailed Aug. 13, 2009, 41 pages.

Final Office Action for U.S. Appl. No. 11/786,030 recieved from the United States Patent and Trademark Office (USPTO) mailed Mar. 2, 2010, 37 pages.

Non-Final Office Action for U.S. Appl. No. 11/786,030 received from the United States Patent and Trademark Office (USPTO) mailed Dec. 19, 2011, 54 pages.

Requirement for Restriction/Election for U.S. Appl. No. 11/845,240 received from the United States Patent and Trademark Office (USPTO) mailed Feb. 23, 2010, 7 pages.

Non-Final Office Action for U.S. Appl. No. 11/845,240 received from the United States Patent and Trademark Office (USPTO) mailed Jun. 17, 2010, 20 pages.

Non-Final Office Action for U.S. Appl. No. 11/845,240 received from the United States Patent and Trademark Office (USPTO) mailed Dec. 3, 2010, 9 pages.

Non-Final Office Action for U.S. Appl. No. 11/845,240 received from the United States Patent and Trademark Office (USPTO) mailed May 11, 2011, 16 pages.

Final Office Action for U.S. Appl. No. 11/845,240 received from the United States Patent and Trademark Office (USPTO) mailed Oct. 17, 2011, 17 pages.

Requirement for Restriction/Election for U.S. Appl. No. 11/933,502 received from the United States Patent and Trademark Office (USPTO) mailed May 13, 2010, 8 pages.

Non-Final Office Action for U.S. Appl. No. 11/933,502 received from the United States Patent and Trademark Office (USPTO) mailed Jun. 22, 2010, 22 pages.

Final Office Action for U.S. Appl. No. 11/933,502 received from the United States Patent and Trademark Office (USPTO) mailed Dec. 6, 2010, 22 pages.

Non-Final Office Action for U.S. Appl. No. 11/933,502 received from the United States Patent and Trademark Office (USPTO) mailed Jun. 28, 2011, 34 pages.

Final Office Action for U.S. Appl. No. 11/933,502 received from the United States Patent and Trademark Office (USPTO) mailed Oct. 31, 2011, 35 pages.

* cited by examiner

SYSTEM AND METHOD OF MONITORING BLACKOUT EVENTS

FIELD OF THE DISCLOSURE

The present disclosure is generally related to monitoring blackout events.

BACKGROUND

Media service providers, such as television service providers, acquire content from content providers, such as television networks, and distribute the content to subscribers. Some content is subject to access restrictions, such as blackouts and other restrictions. Content providers may require media service providers to document or otherwise demonstrate compliance with the access restrictions.

DETAILED DESCRIPTION

In a particular embodiment, a method includes receiving a server blackout event associated with a scheduled blackout of a first media service. The method also includes receiving at least one client blackout event from at least one set top box (STB) affected by the scheduled blackout. For example, the server blackout event and the client blackout event(s) may be received at a subscriber event transmission interface (SETI). The method further includes storing the server blackout event and the client blackout event(s) at a data warehouse.

In another particular embodiment, a blackout monitoring system includes a receiver module to receive a server blackout event and to receive at least one client blackout event of at least one set top box (STB). The server blackout event and the client blackout event(s) are associated with a scheduled blackout of a first media service. The system also includes a data warehouse to store the server blackout event and the client blackout event.

In another particular embodiment, a computer-readable storage medium includes operational instructions that, when executed by a processor, cause the processor to receive a server start event and a server end event associated with a scheduled blackout of a first media service. The computer-readable storage medium also includes operational instructions that, when executed by the processor, cause the processor to receive a plurality of client blackout events from a plurality of set top boxes (STBs) associated with a geographic area affected by the scheduled blackout. The computer-readable storage medium includes operational instructions that, when executed by the processor, cause the processor to generate a blackout audit indicating whether one or more of the plurality of STBs implemented the scheduled blackout.

Figure 1:
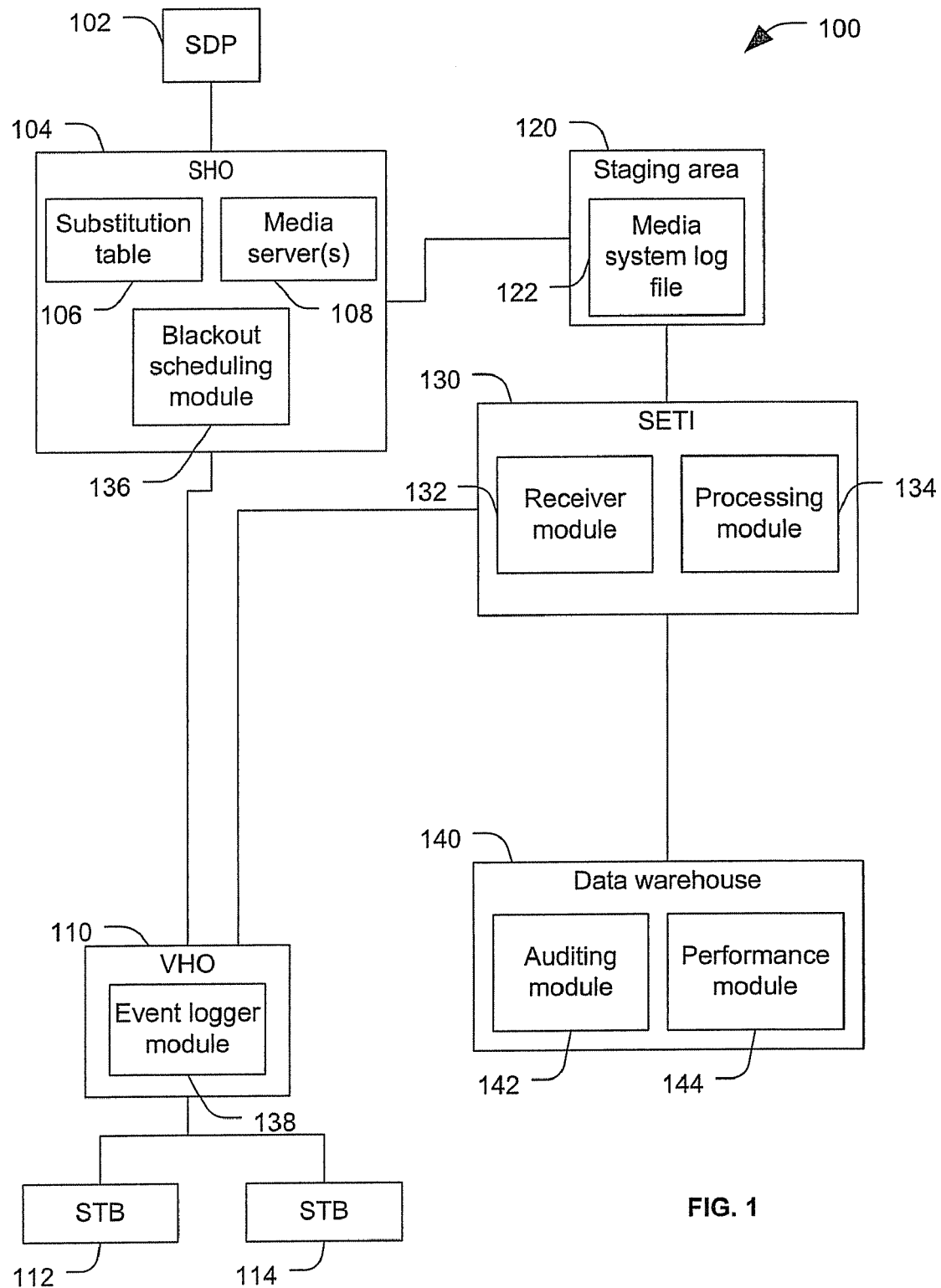
FIG. 1 is a block diagram of a first particular embodiment of a system for monitoring blackout events.

FIG. 1 is a block diagram of a first particular embodiment of a system for monitoring blackout events. The system 100 includes a plurality of elements of a media distribution network. As a result of an agreement between an operator of the media distribution network and a content provider, the media distribution network may prevent certain content from being viewed or otherwise presented within a particular geographic area. For example, according to contractual agreements with certain sporting event organizations, certain sporting events may not be shown on television in a geographic area near where the sporting event takes place. Thus, the media distribution network provider may be required to "blackout" the sporting event in that geographic region. In a particular embodiment, the media distribution network provider may blackout certain content by showing other content in its place. For example, television networks (such as ESPN) may provide the media distribution network with several data streams of content. To illustrate, a first data stream may include content of a first sporting event and a second data stream may include content of a second sporting event. A particular sporting event (e.g., the first sporting event) may be blacked out by presenting a different data stream (e.g., the second data stream including the second sporting event) to subscribers of the media distribution network that are within the geographic area affected by the blackout.

In a particular embodiment, blackouts in the media distribute network may be coordinated and controlled via a service delivery platform (SDP) 102. The SDP 102 may provide a user interface to receive blackout scheduling and other control information from an operator. In response to receiving input scheduling or modifying a blackout, the SDP 102 may send a scheduling request to a super headend office (SHO) 104. A blackout scheduling module 136 at the SHO 104 may receive the scheduling request from the SDP 102. In a particular embodiment, the blackout scheduling module 136 generates a substitution table 106 based on the scheduling request. The substitution table 106 may include a matrix that identifies whether a particular data stream is available in particular geographic regions (such as in areas associated with particular zip codes). For example, in a first geographic region, the television channel associated with ESPN may be directed to a first data stream (e.g., ESPN-1). To implement the blackout, the television channel in the first geographic region associated with ESPN may be directed to a second data stream (ESPN-2). The substitution table 106 may indicate that the channel associated with ESPN in the first geographic region should receive the data stream ESPN-2. For the sake of clarity, the content provider (e.g., a television network, such as ESPN) is referred to as a media service and a particular data stream of content received from the content provider is referred to as a data stream. The media distribution network provider may assign one or more channels to a media service so that users can locate content from the media service readily. The media service may provide a number of data streams to the media distribution network provider and may specify which data streams may be made available at particular times in particular areas. Thus, the substitution table 106 may map a particular data stream to the channel associated with the media service at a particular time. In an illustrative embodiment, different substitution tables 106 may be generated for different geographic regions. The substitution table(s) 106 may be distributed to end user set top boxes (STBs) in the different geographic regions. The substitution table(s) 106 may include data and/or instructions to direct the STBs to implement the scheduled blackout.

The blackout scheduling module 136 may also generate a server blackout event associated with the scheduling request.

The server blackout event may include information describing the scheduled blackout, such as a start time of the blackout, an end time of the blackout, a data stream to be blacked out, a data stream to be substituted for the blacked out data stream (e.g., provided in lieu of the blacked out data stream), a geographic region affected, other information descriptive of the scheduled blackout or implementation of the scheduled blackout, or any combination thereof. In an illustrative embodiment, the server blackout event includes a server start event or a server end event. A server start event may include data descriptive of the start of a scheduled blackout event as an entry in a media system log file 122 at a data staging area 120. A server end event may include data descriptive of the end of a scheduled blackout event as an entry in the media system log file 122 at the data staging area 120.

In a particular embodiment, the substitution table 106 is sent to a video headend office (VHO) 110 for distribution to one or more set top boxes associated with the VHO 110, such as a first representative STB 112 and a second representative STB 114. The STBs 112, 114 may implement the scheduled blackout by mapping data streams to channels as per the substitution table 106. In an illustrative embodiment, when the first representative STB 112 is tuned to a channel affected by the blackout, the first representative STB 112 may tune from a first data stream (the data stream to be blacked out) to a second data stream (the data stream to be substituted). The first representative STB 112 may also generate a client blackout start event to log implementation of the scheduled blackout. Additionally, when the blackout event is over and the first representative STB 112 is tuned to the channel affected by the blackout, the first representative STB 112 may tune from the second data stream (the data stream to be substituted) to the first data stream (the data stream to be blacked out). The first representative STB 112 may also generate a client blackout end event to log implementation of the scheduled blackout. The client blackout start event, the client blackout end event, or both may be sent to the VHO 110 for entry in a log file. In an illustrative embodiment, a particular STB 112, 114 may only generate a client blackout event (e.g., client blackout start events or client blackout end events) when the particular STB 112, 114 is tuned to a channel affected by a scheduled blackout when the blackout starts, ends or is modified. For example, if the first representative STB 112 is tuned to ESPN-1 when a blackout starts that substitutes ESPN-2 for ESPN-1, the first representative STB 112 may implement the scheduled blackout and generate a client blackout start event. In another example, if the first representative STB 112 is not tuned to ESPN-2 when the blackout ends (i.e., when ESPN-1 replaces ESPN-2), the first representative STB 112 may not generate a client blackout end event. The VHO 110 may include an event logger module 138 to receive client blackout events from the STBs served by the VHO 110 and to store the client blackout events in a log file.

In a particular embodiment, the system 100 also includes a subscriber event transmission interface (SETI) 130. The SETI 130 may include a receiver module 132 to receive server blackout events from the data staging area 120 and to request and receive client blackout events from the VHO 110. The SETI 130 may also include a processing module 134 to process the media system log file 122 to identify server blackout events and to store the sever blackout events in a load-ready file. The processing module 134 may also process a log file received from the VHO 110 to identify client blackout events and store the client blackout events in a load-ready file. The client blackout events and the server blackout events may be stored in the same load-ready file or in different load-ready files. In a particular embodiment, the load-ready file(s) have a format compatible with storage in a data warehouse 140. For example, the load-ready file(s) may include a flat file parsed for storage in an appropriate data table of the data warehouse. In another example, the load-ready file may have a table structure prepared for storage at the data warehouse 140.

The data warehouse 140 may store the server blackout events and the client blackout events for retrieval and auditing. In a particular embodiment, the data warehouse 140 includes an auditing module 142. The auditing module 142 may be used to determine auditing metrics based on the server blackout events and the client blackout events. For example, the auditing module 142 may determine whether the first STB 112 blacked out a particular data stream of a media service according to the scheduled blackout. The data warehouse 140 may also include a performance module 144. The performance module 144 may determine switching metrics of the STBs with respect to the scheduled blackout. For example, the performance module 144 may determine a time required for the STBs to receive the substitution table(s) after the blackout request was received, a time for the STBs to implement the blackout, other statistics associated with implementation of blackouts on the media distribution network, or any combination thereof.

Figure 2:
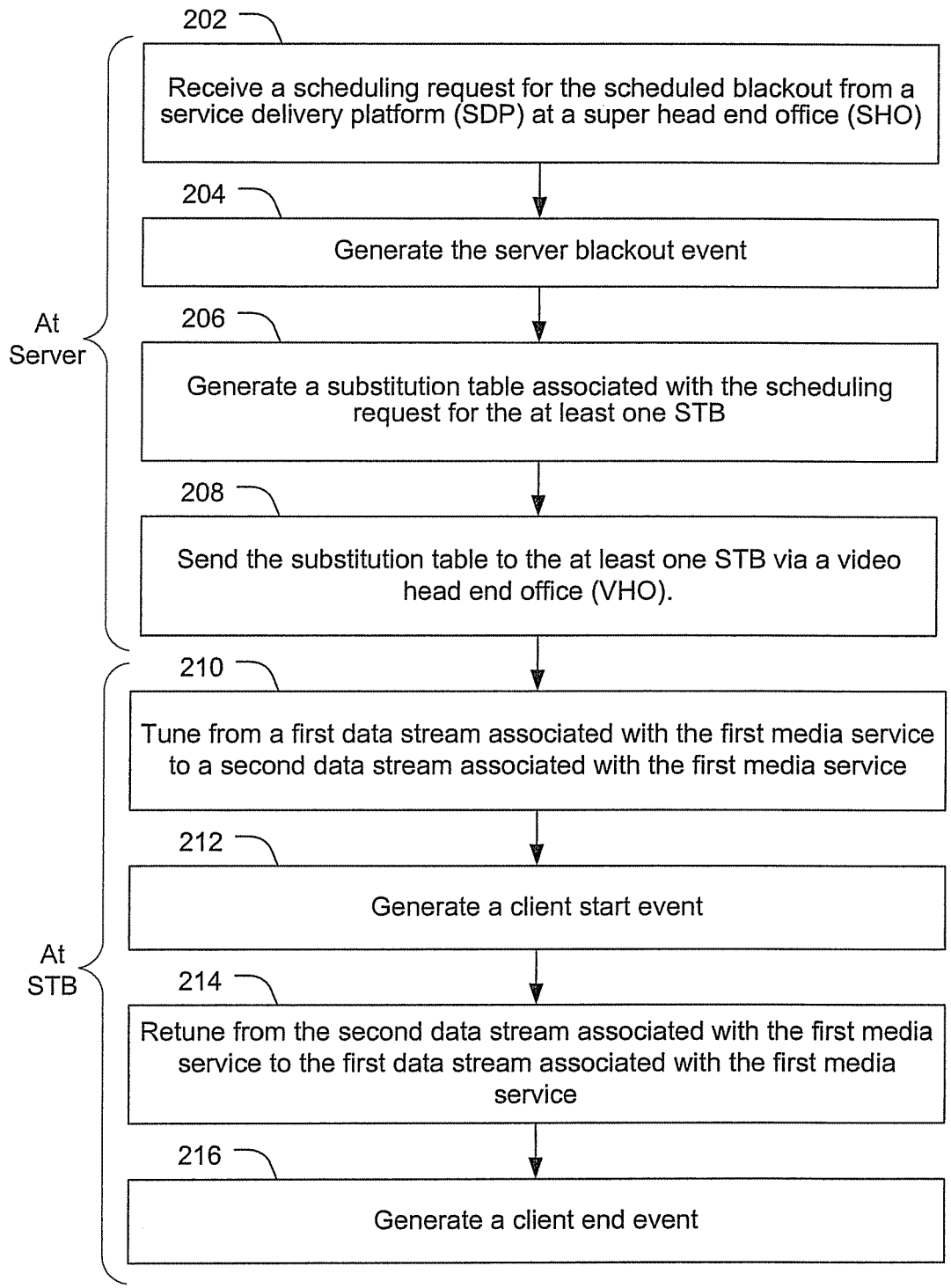
FIG. 2 is a flow chart of a first particular embodiment of a method of monitoring blackout events.

FIG. 2 is a flow chart of a first particular embodiment of a method of monitoring blackout events. The method includes, at 202, receiving a scheduling request for a scheduled blackout from a service delivery platform (SDP) at a super head end office (SHO). The method also includes, at 204, generating a server blackout event associated with the scheduling request for the scheduled blackout. For example, the server blackout event may be stored in a media system log file. The method includes, at 206, generating a substitution table associated with the scheduling request. In a particular embodiment, more than one substitution table may be generated. The substitution table(s) are sent to at least one STB via a video head end office (VHO), at 208.

In a particular embodiment, the substitution table is received at a STB and the STB implements the scheduled blackout event by tuning from a first data stream associated with a first media service affected by the blackout to a second data stream associated with the first media service, at 210. The STB may generate a client blackout start event, at 212, when the STB is tuned to the first data stream when the blackout event starts. In a particular embodiment, when the STB is tuned to a particular media service that is affect by a blackout when the blackout ends, the STB returns to a data stream normally associated with the particular media service. To illustrate, continuing the example above, the STB may retune from the second data stream associated with the first media service to the first data stream associated with the first media service, at 214. The STB may generate a client blackout end event, at 216, when the STB is tuned to the second data stream when the blackout event ends.

Figure 3:
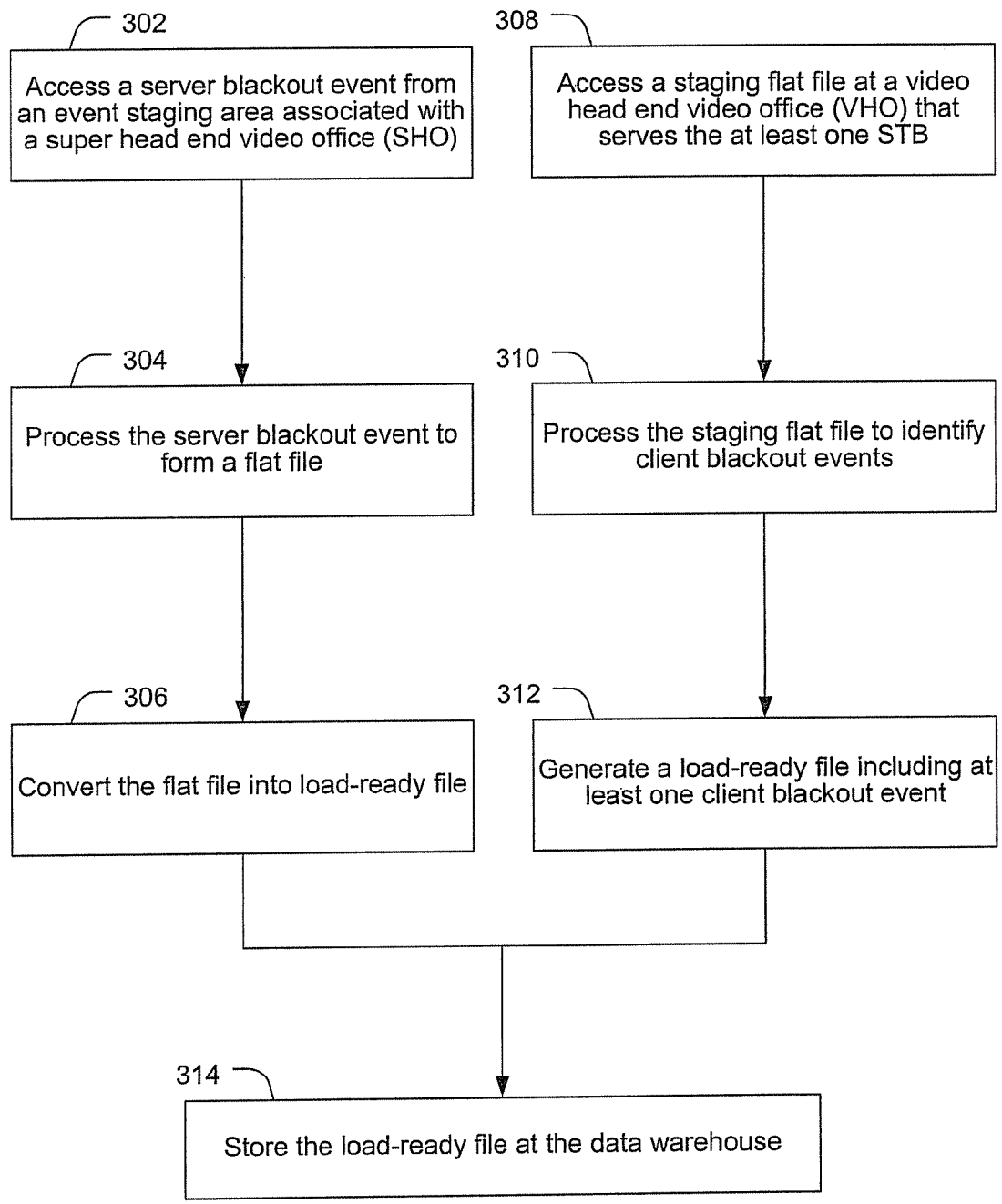
FIG. 3 is a flow chart of a second particular embodiment of a method of monitoring blackout events.

FIG. 3 is a flow chart of a second particular embodiment of a method of monitoring blackout events. The method includes, at 302, accessing a server blackout event from an event staging area associated with a super head end video office (SHO), such as the staging area 120 depicted in FIG. 1. In a particular embodiment, the event staging area includes a server log file that includes data associated with a plurality of server events, including server blackout events. The server blackout events may include server start events, server end events, other events indicating actions taken by the server to implement the scheduled blackout, or any combination thereof. The server blackout event may be processed, at 304, to form a flat file. For example, a media system log file may be parsed to identify server blackout events and to store the server blackout events to a delimited flat file. The flat file may be converted, at 306, into a load-ready file having a format compatible with a data warehouse. The load-ready file may be stored at the date warehouse, at 314, for future retrieval or processing.

In an illustrative embodiment, the method also includes, at 308, accessing a staging flat file at a video head end video office (VHO) that serves at least one STB affected by the scheduled blackout. For example, the staging flat file may include a plurality of client blackout events received from a plurality of STBs associated with a geographic area affected by the scheduled blackout. The client blackout events may include client blackout start events, client blackout end events, other events indicating actions taken by the STBs to implement the scheduled blackout, or any combination thereof. The staging flat file is processed, at 310, to identify client blackout events. A load-ready file including at least one client blackout event is generated, at 312. The load-ready file may also include client blackout events associated with other blackouts, such as blackouts affecting different media services or blackouts affecting different geographic regions. The load-ready file has a format compatible with the data warehouse. The load-ready file may be stored at the date warehouse, at 314, for future retrieval or processing.

Figure 4:
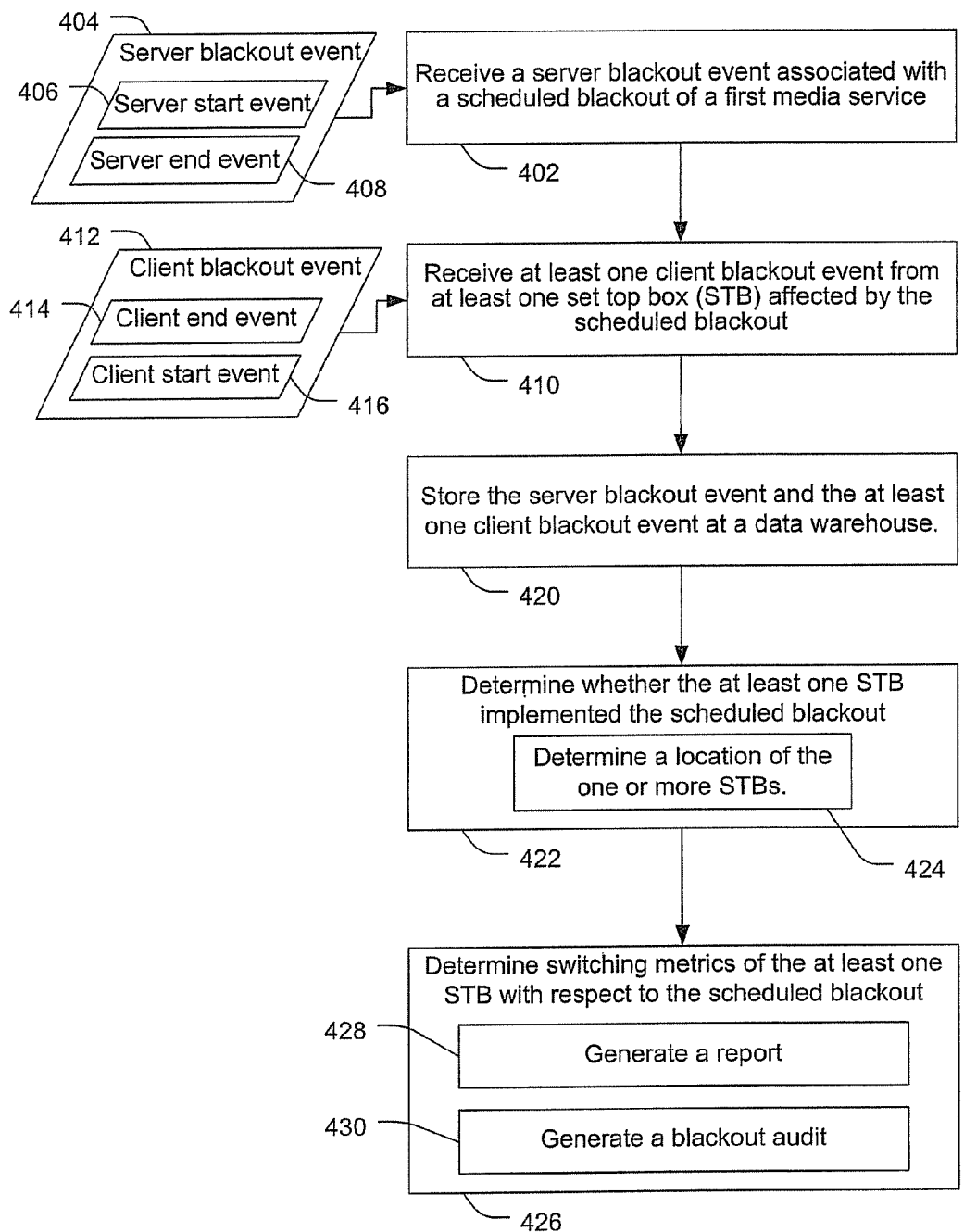
FIG. 4 is a flow chart of a third particular embodiment of a method of monitoring blackout events.

FIG. 4 is a flow chart of a third particular embodiment of a method of monitoring blackout events. The method includes, at 402, receiving a server blackout event 404 associated with a scheduled blackout of a first media service. The server blackout event 404 may include a server start event 406, a server end event 408, another event indicating an action taken by a server to implement the scheduled blackout, or any combination thereof. In a particular embodiment, the server blackout event 404 may be received at a subscriber event transmission interface (SETI) of a media distribution network, such as the media distribution network described with reference to FIG. 1.

The method also includes, at 410, receiving at least one client blackout event 412 from at least one set top box (STB) affected by the scheduled blackout. The client blackout event(s) 412 may include a client blackout start event 414, a client blackout end event 416, another event indicating actions taken by the STB(s) to implement the scheduled blackout, or any combination thereof. For example, a client blackout start event may include data indicating when a particular STB implemented the scheduled blackout by changing from a first data stream associated with the first media service to a second data stream associated with the first media service. The client blackout start event also indicates that, at a time that the scheduled blackout was to start, the particular STB was tuned to the first data stream and retuned to the second data stream to implement the scheduled blackout. A client blackout end event may include data indicating when the particular STB (or another STB) ended implementation of the scheduled blackout by changing from the second data stream back to the first data stream. That is, the client blackout end event indicates that, at a time that the scheduled blackout was to end, the particular STB was tuned to the second data stream and retuned to the first data stream to end the scheduled blackout. The client blackout event(s) may be received from an event log of a video headend office (VHO) associated with the STB(s). In a particular embodiment, the client blackout event 412 is received at the SETI of the media distribution network, such as the media distribution network described with reference to FIG. 1. The method also includes, at 420, storing the server blackout event(s) and the client blackout event(s) at a data warehouse.

In a particular embodiment, the method includes, at 422, determining, based on the server blackout event(s) and the client blackout event(s) whether at least one STB implemented the scheduled blackout. For example, the method may include, at 424, determining a location of one or more STBs that should have implemented the scheduled blackout based on the server blackout events and analyzing the client blackout events to determine whether the one or more STBs implemented the scheduled blackout.

The method also includes, at 426, determining switching metrics of the at least one STB with respect to the scheduled blackout. In a particular embodiment, determining the switching metrics may include, at 428, generating a report indicating whether the at least one STB complied with the scheduled blackout. In another particular embodiment, determining the switching metrics may include, at 430, generating a blackout audit to assess whether one or more of the plurality of STBs implemented the scheduled blackout. Generating the blackout audit may include determining when one or more of the plurality of STBs switched from a first data stream associated with the first media service to a second data stream associated with the first media service and determining a location of the one or more STBs.

In a particular embodiment, the steps of the methods described herein are executed in the order shown by the figures. In alternative embodiments, the steps may be executed in alternative sequences.

In conjunction with the configuration of structure described herein, the system and method disclosed provide monitoring of blackouts. In a particular embodiment, server blackout events and client blackout events are received and stored in a data warehouse. The server blackout events indicate actions taken by a server of a media distribution network to implement a scheduled blackout. The client blackout events indicate actions taken by one or more set-top boxes to implement the scheduled blackout. The server blackout events and the client blackout events may be analyzed to determine whether the scheduled blackout was implemented properly and to provide audit data to demonstrate that the blackout was implemented.

Figure 5:
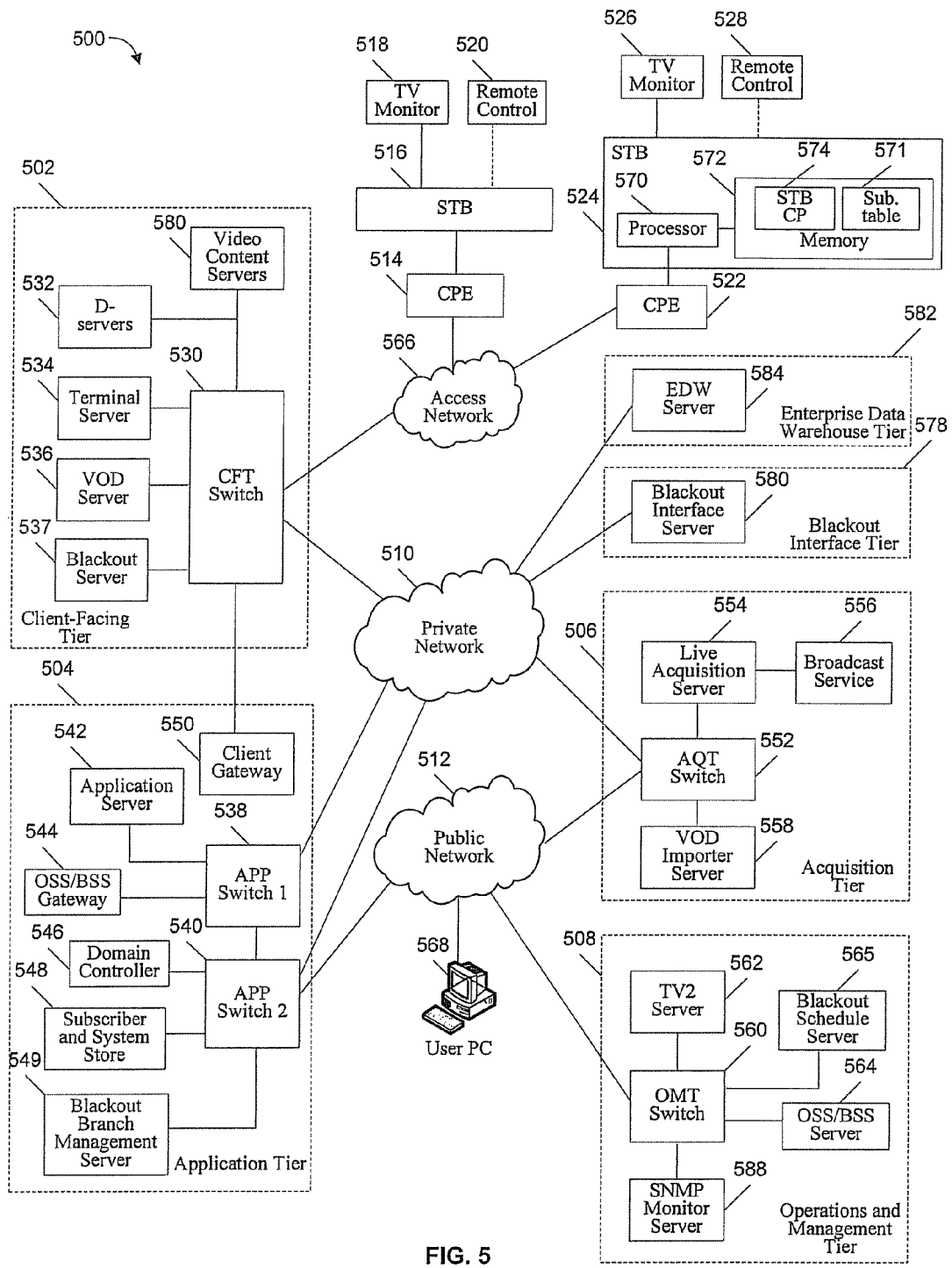
FIG. 5 is a block diagram of a second particular embodiment of a system for monitoring blackout events.

Referring to FIG. 5, an illustrative embodiment of an Internet Protocol Television (IPTV) system generally designated 500 is shown. In a particular illustrative embodiment, a media distribution network as discussed with reference to FIG. 1, may include elements of a system such as the IPTV system 500. As shown, the system 500 can include a client facing tier 502, an application tier 504, an acquisition tier 506, an operations and management tier 508, a blackout interface tier 578, and an enterprise data warehouse (EDW) tier 582. Each tier 502, 504, 506, 508, 578, 582 is coupled to a private network 510; to a public network 512, such as the Internet; or to both the private network 510 and the public network 512. For example, the client-facing tier 502 can be coupled to the private network 510. Further, the application tier 504 can be coupled to the private network 510 and to the public network 512. The acquisition tier 506 can also be coupled to the private network 510 and to the public network 512. Additionally, the operations and management tier 508 can be coupled to the public network 512. Further, the EDW tier 582 and the blackout interface tier 578 can be coupled to the private network 510.

As illustrated in FIG. 5, the various tiers 502, 504, 506, 508, 578, 582 communicate with each other via the private network 510 and/or the public network 512. For instance, the client-facing tier 502 may communicate with the application tier 504 and the acquisition tier 506 via the private network 510. The application tier 504 may communicate with the acquisition tier 506 via the private network 510. Further, the application tier 504 may communicate with the acquisition tier 506 and the operations and management tier 508 via the public network 512. Moreover, the acquisition tier 506 may communicate with the operations and management tier 508 via the public network 512. In a particular embodiment, elements of the application tier 504, including, but not limited to, a client gateway 550, may communicate directly with the client-facing tier 502.

The client-facing tier 502 may communicate with user equipment via an access network 566, such as an Internet Protocol Television (IPTV) access network. In an illustrative embodiment, customer premises equipment (CPE) 514, 522 can be coupled to a local switch, router, modem, or other device of the access network 566. The client-facing tier 502 may communicate with a first representative set-top box device 516 via the first CPE 514 and with a second representative set-top box device 524 via the second CPE 522. In a particular embodiment, the first representative set-top box device 516 and the first CPE 514 may be located at a first customer (or subscriber) premise, and the second representative set-top box device 524 and the second CPE 522 may be located at a second customer (or subscriber) premise. In another particular embodiment, the first representative set-top box device 516 and the second representative set-top box device 524 may be located at a single customer premise, each coupled to one of the CPE 514, 522. The CPE 514, 522 may include routers, local area network devices, modems, such as digital subscriber line (DSL) modems, any other suitable devices for facilitating communication between a set-top box device and the access network 566, or any combination thereof.

In an exemplary embodiment, the client-facing tier 502 may be coupled to the CPE 514, 522 via fiber optic cables. In another exemplary embodiment, the CPE 514, 522 may include digital subscriber line (DSL) modems that are coupled to one or more network nodes via twisted pairs, and the client-facing tier 502 may be coupled to the network nodes via fiber-optic cables. Each set-top box device 516, 524 may process data received via the access network 566, via an IPTV software platform, such as Microsoft® TV IPTV Edition.

The first set-top box device 516 may be coupled to a first external display device, such as a first television monitor 518, and the second set-top box device 524 may be coupled to a second external display device, such as a second television monitor 526. Moreover, the first set-top box device 516 may communicate with a first remote control 520, and the second set-top box device 524 may communicate with a second remote control 528. The set-top box devices 516, 524 may include IPTV set-top box devices; video gaming devices or consoles that are adapted to receive IPTV content; personal computers or other computing devices that are adapted to emulate set-top box device functionalities; any other device adapted to receive IPTV content and transmit data to an IPTV system via an access network; or any combination thereof.

In an exemplary, non-limiting embodiment, each set-top box device 516, 524 can receive data, video, or any combination thereof, from the client-facing tier 502 via the access network 566 and render or display the data, video, or any combination thereof, at the display device 518, 526 to which it is coupled. In an illustrative embodiment, the set-top box devices 516, 524 can include tuners that receive and decode television programming signals or packet streams for transmission to the display devices 518, 526. Further, the set-top box devices 516, 524 can include a STB processor 570 and a STB memory device 572 that is accessible to the STB processor 570. In one embodiment, a computer program, such as the STB computer program 574, can be embedded within the STB memory device 572. Additionally, in a particular embodiment, the set-top box devices 516, 524 may include a substitution table 571. The substitution table 571 may include information used by the set-top box devices 516, 524 to implement blackouts. For example, the substitution table 571 may include a matrix mapping data streams to particular channels or media services.

In an illustrative embodiment, the STB computer program 574 include instructions that cause set-top box devices 516, 524 to implement scheduled blackouts based on the substitution table 571. For example, the set-top box devices 516, 524 may tune from a first data stream associated with a media service to a second data stream associated with the media service, based on the substitution table 571, to implement a scheduled blackout. The STB computer program 574 may also include instructions that cause the set-top box devices 516, 524 to generate a client blackout event whenever the set-top box devices 516, 524 perform actions to implement a scheduled blackout. The client blackout events may be reported to the client-facing tier 502.

In an illustrative embodiment, the client-facing tier 502 can include a client-facing tier (CFT) switch 530 that manages communication between the client-facing tier 502 and the access network 566 and between the client-facing tier 502 and the private network 510. As illustrated, the CFT switch 530 is coupled to one or more data servers, such as image and data servers ("D-servers") 532, that store, format, encode, replicate, or otherwise manipulate or prepare video content for communication from the client-facing tier 502 to the set-top box devices 516, 524. The CFT switch 530 can also be coupled to a terminal server 534 that provides terminal devices with a connection point to the private network 510. In a particular embodiment, the CFT switch 530 can be coupled to a video-on-demand (VOD) server 536 that stores or provides VOD content imported by the IPTV system 500. Further, the CFT switch 530 is coupled to one or more video servers 580 that receive video content and transmit the content to the set-top boxes 516, 524 via the access network 566. Additionally, the CFT switch 530 is coupled to one or more blackout servers 537 that receive substitution tables via the private network 510 and send the substitution tables to the set-top box devices 516, 524. Additionally, the one or more blackout servers 537 may receive client blackout events from the set-top box devices 516, 524 and store the client blackout events to an event log.

In an illustrative embodiment, the client-facing tier 502 can communicate with a large number of set-top boxes, such as the representative set-top boxes 516, 524 over a wide geographic area, such as a metropolitan area, a viewing area, a statewide area, a regional area, a nationwide area or any other suitable geographic area, market area, or subscriber or customer group that can be supported by networking the client-facing tier 502 to numerous set-top box devices. In a particular embodiment, the CFT switch 530, or any portion thereof, can include a multicast router or switch that communicates with multiple set-top box devices via a multicast-enabled network.

As illustrated in FIG. 5, the application tier 504 can communicate with both the private network 510 and the public network 512. The application tier 504 can include a first application tier (APP) switch 538 and a second APP switch 540. In a particular embodiment, the first APP switch 538 can be coupled to the second APP switch 540. The first APP switch 538 can be coupled to an application server 542 and to an OSS/BSS gateway 544. In a particular embodiment, the application server 542 can provide applications to the set-top box devices 516, 524 via the access network 566, which enable the set-top box devices 516, 524 to provide functions, such as interactive program guides, video gaming, display, messaging, processing of VOD material and other IPTV content, etc. In an illustrative embodiment, the application server 542 provides location information to the set-top box devices 516, 524. In a particular embodiment, the OSS/BSS gateway 544 includes operation systems and support (OSS) data, as well as billing systems and support (BSS) data. In one embodiment, the OSS/BSS gateway 544 can provide or restrict access to an OSS/BSS server 564 that stores operations and billing systems data.

The second APP switch 540 can be coupled to a domain controller 546 that provides Internet access, for example, to users at their computers 568 or via the public network 512. For example, the domain controller 546 can provide remote Internet access to IPTV account information, e-mail, personalized Internet services, messaging services or other online services via the public network 512. In addition, the second APP switch 540 can be coupled to a subscriber and system store 548 that includes account information, such as account information that is associated with users who access the IPTV system 500 via the private network 510 or the public network 512. In an illustrative embodiment, the subscriber and system store 548 can store subscriber or customer data and create subscriber or customer profiles that are associated with IP addresses, stock-keeping unit (SKU) numbers, other identifiers, or any combination thereof, of corresponding set-top box devices 516, 524. In another illustrative embodiment, the subscriber and system store 548 can store data associated with capabilities of set-top box devices associated with particular customers. The application tier 504 may also include a blackout branch management server 549 that determines, based on a geographic area information associated with each of the set-top box devices 516, 524, which set-top box devices 516, 524 should implement particular blackout events. Based on information from the blackout branch management server 549, appropriate substitution table data may be sent to the affected set-top box devices 516, 524.

In a particular embodiment, the application tier 504 includes a client gateway 550 that communicates data directly to the client-facing tier 502. In this embodiment, the client gateway 550 is coupled directly to the CFT switch 530. The client gateway 550 can provide user access to the private network 510 and the tiers coupled thereto. In an illustrative embodiment, the set-top box devices 516, 524 can access the IPTV system 500 via the access network 566, using information received from the client gateway 550. User devices can access the client gateway 550 via the access network 566, and the client gateway 550 can allow such devices to access the private network 510 once the devices are authenticated or verified. Similarly, the client gateway 550 can prevent unauthorized devices, such as hacker computers or stolen set-top box devices from accessing the private network 510, by denying access to these devices beyond the access network 566.

For example, when the first representative set-top box device 516 accesses the client-facing tier 502 via the access network 566, the client gateway 550 can verify subscriber information by communicating with the subscriber and system store 548 via the private network 510. Further, the client gateway 550 can verify billing information and status by communicating with the OSS/BSS gateway 544 via the private network 510. In one embodiment, the OSS/BSS gateway 544 can transmit a query via the public network 512 to the OSS/BSS server 564. After the client gateway 550 confirms subscriber and/or billing information, the client gateway 550 can allow the set-top box device 516 to access IPTV content and VOD content at the client-facing tier 502. If the client gateway 550 cannot verify subscriber information for the set-top box device 516, e.g., because it is connected to an unauthorized twisted pair, the client gateway 550 can block transmissions to and from the set-top box device 516 beyond the access network 566.

As indicated in FIG. 5, the acquisition tier 506 includes an acquisition tier (AQT) switch 552 that communicates with the private network 510. The AQT switch 552 can also communicate with the operations and management tier 508 via the public network 512. In a particular embodiment, the AQT switch 552 can be coupled to a live acquisition server 554 that receives or acquires television content, movie content, advertisement content, other video content, or any combination thereof, from a broadcast service 556, such as a satellite acquisition system or satellite head-end office. In a particular embodiment, the live acquisition server 554 can transmit content to the AQT switch 552, and the AQT switch 552 can transmit the content to the CFT switch 530 via the private network 510.

In an illustrative embodiment, content can be transmitted to the D-servers 532, where it can be encoded, formatted, stored, replicated, or otherwise manipulated and prepared for communication from the video server(s) 580 to the set-top box devices 516, 524. The CFT switch 530 can receive content from the video server(s) 580 and communicate the content to the CPE 514, 522 via the access network 566. The set-top box devices 516, 524 can receive the content via the CPE 514, 522, and can transmit the content to the television monitors 518, 526. In an illustrative embodiment, video or audio portions, or both, of the content can be streamed to the set-top box devices 516, 524.

Further, the AQT switch 552 can be coupled to a video-on-demand importer server 558 that receives and stores television or movie content received at the acquisition tier 506 and communicates the stored content to the VOD server 536 at the client-facing tier 502 via the private network 510. Additionally, at the acquisition tier 506, the video-on-demand (VOD) importer server 558 can receive content from one or more VOD sources outside the IPTV system 500, such as movie studios and programmers of non-live content. The VOD importer server 558 can transmit the VOD content to the AQT switch 552, and the AQT switch 552, in turn, can communicate the material to the CFT switch 530 via the private network 510. The VOD content can be stored at one or more servers, such as the VOD server 536.

When users issue requests for VOD content via the set-top box devices 516, 524, the requests can be transmitted over the access network 566 to the VOD server 536, via the CFT switch 530. Upon receiving such requests, the VOD server 536 can retrieve the requested VOD content and transmit the content to the set-top box devices 516, 524 across the access network 566, via the CFT switch 530. The set-top box devices 516, 524 can transmit the VOD content to the television monitors 518, 526. In an illustrative embodiment, video or audio portions, or both, of VOD content can be streamed to the set-top box devices 516, 524.

FIG. 5 further illustrates that the operations and management tier 508 can include an operations and management tier (OMT) switch 560 that conducts communication between the operations and management tier 508 and the public network 512. In the embodiment illustrated by FIG. 5, the OMT switch 560 is coupled to a TV2 server 562. Additionally, the OMT switch 560 can be coupled to an OSS/BSS server 564 and to a simple network management protocol (SNMP) monitor server 588 that monitors network devices within or coupled to the IPTV system 500. The OMT switch 560 may also be coupled to a blackout schedule server 565. The blackout schedule server 565 may receive a blackout request from a blackout server 580 of the blackout interface tier 578. For example, an operator may interface with the blackout server 580 to input data specifying a blackout. The data specifying the blackout may indicate a time of the blackout, a media service affected, a data stream to be blacked out, a data stream to be substituted for the blacked out data stream, a geographic region affected by the blackout, other data related to the blackout, or any combination thereof. In response to the blackout request, the blackout schedule server 565 may generate a substitution table based on the blackout request. The blackout schedule server 565 may also generate a server blackout event indicating that the substitution table was generated and sent to implement the blackout.

In an illustrative embodiment, the live acquisition server 554 can transmit content to the AQT switch 552, and the AQT switch 552, in turn, can transmit the content to the OMT switch 560 via the public network 512. In this embodiment, the OMT switch 560 can transmit the content to the TV2 server 562 for display to users accessing the user interface at the TV2 server 562. For example, a user can access the TV2 server 562 using a personal computer 568 coupled to the public network 512.

In a particular embodiment, the enterprise data warehouse (EDW) tier 582 includes an EDW server 584. The EDW server 584 may access the client blackout events generated by the set-top box devices 516, 524 and the server blackout events generated by the blackout schedule server 565 and may store the blackout events. The EDW server 584 may also analyze the blackout events to determine whether the scheduled blackout was implemented correctly and to determine metrics associated with implementing the scheduled blackout and other scheduled blackouts.

Figure 6:
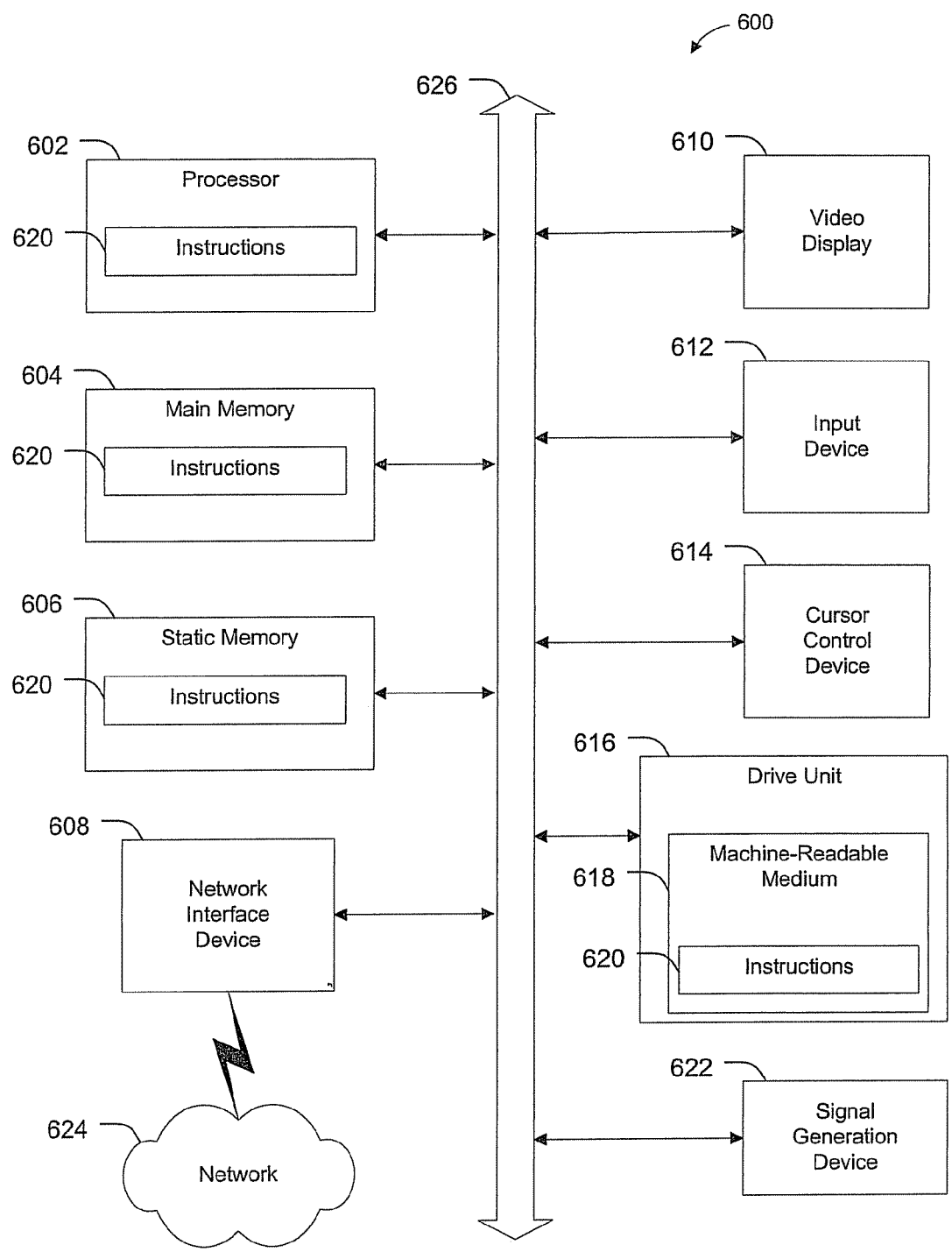
FIG. 6 is a block diagram of an illustrative general computer system.

Referring to FIG. 6, an illustrative embodiment of a general computer system is shown and is designated 600. The computer system 600 can include a set of instructions that can be executed to cause the computer system 600 to perform any one or more of the methods or computer based functions disclosed herein. The computer system 600 may operate as a standalone device or may be connected, e.g., using a network, to other computer systems or peripheral devices. For example, the computer system 600 may include or be included within any one or more of the service delivery platforms, super headend offices, media servers, staging areas, subscriber event transmission interfaces, data warehouses, video headend offices, set-top box devices, servers, switches, customer premises equipment, gateways or controllers, illustrated and discussed with reference to FIG. 1 and FIG. 5.

In a networked deployment, the computer system may operate in the capacity of a server or as a client user computer in a server-client user network environment or as a peer computer system in a peer-to-peer (or distributed) network environment. The computer system 600 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a display device, a personal trusted device, a web appliance, a network router, switch or bridge, or any other machine capable of executing a set of instructions (sequential or otherwise) that specify actions to be taken by that machine. In a particular embodiment, the computer system 600 can be implemented using electronic devices that provide audio, video or data communication.

Further, while a single computer system 600 is illustrated, the term "system" shall also be taken to include any collection of systems or sub-systems that individually or jointly execute a set, or multiple sets, of instructions to perform one or more computer functions.

As illustrated in FIG. 6, the computer system 600 may include a processor 602, e.g., a central processing unit (CPU), a graphics processing unit (GPU), or both. Moreover, the computer system 600 can include a main memory 604 and a static memory 606, that can communicate with each other via a bus 608. As shown, the computer system 600 may further include a video display unit 610, such as a liquid crystal display (LCD), an organic light emitting diode (OLED), a flat panel display, a solid state display, a cathode ray tube (CRT), or a projection display device. Additionally, the computer system 600 may include an input device 612, such as a keyboard, and a cursor control device 614, such as a mouse. The computer system 600 can also include a disk drive unit 616, a signal generation device 618, such as a speaker or remote control, and a network interface device 620.

In a particular embodiment, as depicted in FIG. 6, the disk drive unit 616 may include a computer-readable medium 622 in which one or more sets of instructions 624, e.g. software, can be embedded. Further, the instructions 624 may embody one or more of the methods or logic as described herein. In a particular embodiment, the instructions 624 may reside completely, or at least partially, within the main memory 604, the static memory 606, and/or within the processor 602 during execution by the computer system 600. The main memory 604 and the processor 602 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 624 (e.g., a storage medium) or receives and executes instructions 624 (e.g., via a transmission medium) responsive to a propagated signal, so that a device connected to a network 626 can communicate audio, video or data over the network 626. Further, the instructions 624 may be transmitted or received over the network 626 via the network interface device 620.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium and other equivalents and successor media, in which data or instructions may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. In another example, standards for media, media compression and media transmission (e.g., MP3, MPEG-1, MPEG-2, MPEG-3, MPEG-4, Windows Media Video, H.264, H.261, H.263, Audio Interchange File Format, WAV, RealAudio, G.719, G.722, G.722.1, NTSC, PAL, NICAM, BTSC, ATSC, SECAM) represent examples of state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method, comprising:
receiving, at a subscriber event transmission interface, a server blackout event associated with a scheduled blackout of a first media service, wherein the server blackout event is received from a super headend office;
receiving, at the subscriber event transmission interface from a video headend office, at least one client blackout event from each of at least one set top box affected by the scheduled blackout, wherein each set top box receives the first media service from the super headend office via the video headend office, and wherein the scheduled blackout is to be implemented by each of the at least one set top box; and
generating, at the subscriber event transmission interface, a compliance report indicating whether each set top box complied with the scheduled blackout, wherein the compliance report is generated based on analysis of the server blackout event and of the at least one client blackout event.

2. The method of claim 1, wherein the server blackout event comprises at least one of a server start event and a server end event, wherein the server start event includes data specifying a start of the scheduled blackout, and wherein the server end event includes data specifying an end of the scheduled blackout.

3. The method of claim 1, wherein the at least one client blackout event includes a client blackout start event, wherein the client blackout start event includes data indicating when the at least one set top box implemented the scheduled blackout by changing from a first data stream associated with the first media service to a second data stream associated with the first media service.

4. The method of claim 3, wherein the at least one client blackout event includes a client blackout end event, wherein the client blackout end event includes data indicating when the at least one set top box ended implementation of the scheduled blackout by changing from the second data stream back to the first data stream.

5. The method of claim 1, further comprising determining, at the subscriber event transmission interface, based on the server blackout event and the at least one client blackout event whether the at least one set top box implemented the scheduled blackout.

6. The method of claim 5, wherein implementing the scheduled blackout comprises tuning from a first data stream associated with the first media service to a second data stream associated with the first media service.

7. The method of claim 1, wherein the at least one client blackout event is received from an event log of the video headend office that facilitates delivery of the first media service to the at least one set top box.

8. The method of claim 1,
wherein the server blackout event is generated at the super headend office in response to the super headend office receiving a scheduling request from a service delivery platform that is distinct from the super headend office;
wherein a substitution table associated with the scheduling request is generated at that super headend office; and
wherein the substitution table is sent from the super headend office to the at least one set top box via the video head end office, wherein the at least one set top box is to implement the scheduled blackout by utilizing the substitution table that identifies substitution data service based in part on geographic region.

9. The method of claim 1, further comprising determining, at an audit module associated with the subscriber event transmission interface, switching metrics of the at least one set top box with respect to the scheduled blackout.

10. The method of claim 1, further comprising storing, at a data warehouse associated with the subscriber event transmission interface, the server blackout event and the at least one client blackout event.

11. The method of claim 10, wherein the subscriber event transmission interface receives the server blackout event by accessing an event staging area associated with the subscriber event transmission interface; and wherein the method further comprises:
processing, at the subscriber event transmission interface, the server blackout event to form a flat file; and
converting, at the subscriber event transmission interface, the flat file into a load-ready file having a format compatible with the data warehouse.

12. The method of claim 1, wherein receiving the at least one client blackout event from each of the at least one set top box further comprises:
accessing, from the subscriber event transmission interface, a staging flat file at the video head end office that provides the at least one set top box with the first media service;
processing, at the subscriber event transmission interface, the staging flat file to identify the at least one client blackout event; and
generating, at the subscriber event transmission interface, a load-ready file including the at least one client blackout event, wherein the load ready file has a format compatible with the data warehouse.

13. A blackout monitoring system, comprising:
a subscriber event transmission interface comprising:
a receiver module to:
receive a server blackout event that is associated with a scheduled blackout of a first media service, wherein the server blackout event is received from a super headend office, and
receive, from a video headend office, at least one client blackout event from each of at least one set top box affected by the scheduled blackout, wherein each set top box receives the first media service from the super headend office via the video headend office, and wherein the scheduled blackout is to be implemented by each of the at least one set top box; and an auditing module, associated with the subscriber event transmission interface, to generate a compliance report indicating whether each set top box complied with the scheduled blackout, wherein the compliance report is generated based on analysis of the server blackout event and of the at least one client blackout event.

14. The system of claim 13, further comprising a data warehouse, associated with the subscriber event transmission interface, to store the server blackout event and the at least one client blackout event.

15. The system of claim 14, wherein the subscriber event transmission interface further comprises a processing module to process a media system log file to identify the server blackout event and to store the server blackout event at the data warehouse.

16. The system of claim 15, wherein the receiver module receives the at least one client blackout event in a staging flat file from the video headend office.

17. The system of claim 16, wherein an event logger module of the video headend office receives the at least one client blackout event from each of the at least one set top box affected by the scheduled blackout.

18. The system of claim 13, wherein the server blackout event associated with the scheduling request is generated at the super headend office in response to the super headend office receiving a scheduling request from a service delivery platform that is distinct from the super headend office, wherein a substitution table associated with the scheduling request is generated at the super headend office, wherein the substitution table is sent from the super headend office to the at least one set top box via the video headend office, wherein the at least one set top box implements the scheduled blackout by utilizing the substitution table that identifies substitution data service based in part on geographic region.

19. The system of claim 13, further comprising a performance module, associated with the subscriber event transmission interface, to determine switching metrics of the at least one set top box with respect to the scheduled blackout.

20. The system of claim 13, wherein the auditing module determines auditing metrics based on the analysis of the server blackout event and the at least one client blackout event.

21. A non-transitory computer-readable storage medium comprising operational instructions that, when executed by a processor, cause the processor to implement a method comprising:
receiving, at a subscriber event transmission interface, a server start event and a server end event associated with a scheduled blackout of a first media service, wherein the server start event and the server end event are received from a super headend office in response to the super headend office receiving a scheduling request from a service delivery platform that is distinct from the super headend office;
receiving, at the subscriber event transmission interface from a video headend office, a plurality of client blackout events from a plurality of set top boxes associated with a geographic area affected by the scheduled blackout, wherein each of the plurality of set top boxes receives the first media service from the super headend office via the video headend office, and wherein the scheduled blackout is to be implemented by each of the plurality of set top boxes; and
generating, at the subscriber event transmission interface, a compliance report indicating whether each of the plurality of set top boxes complied with the scheduled blackout, wherein the compliance report is generated based on analysis of the server start event, the server end event, and the plurality of client blackout events.

22. The non-transitory computer-readable storage medium of claim 21, wherein receiving the server start event and the server end event from the super headend office further comprises requesting, at the subscriber event transmission interface, a data file from a data staging area, wherein the data file includes the server start event and the server end event, wherein the data staging area is associated with the subscriber event transmission interface.

23. The non-transitory computer-readable storage medium of claim 22, further comprising operational instructions that, when executed by the processor, cause the processor to modify, at the subscriber event transmission interface, the data file to faun a load-ready file having a format compatible with a data warehouse and to store the load-ready file at the data warehouse, wherein the data warehouse is associated with the subscriber event transmission interface.

24. The non-transitory computer-readable storage medium of claim 21, wherein the plurality of client blackout events comprise at least one client blackout start event, wherein the at least one client blackout start event indicates whether, at a start time of the scheduled blackout, a particular set top box of the plurality of set top boxes was tuned to a first data stream associated with the first media service and was retuned to a second data stream associated with the first media service to implement the scheduled blackout.

25. The non-transitory computer-readable storage medium of claim 21, wherein the plurality of client blackout events comprise at least one client blackout end event, wherein the at least one client blackout end event indicates whether, at an end time of the scheduled blackout, a particular set top box of the plurality of set top boxes was tuned to a second data stream associated with the first media service and was retuned to a first data stream associated with the first media service to end the scheduled blackout.

26. The non-transitory computer-readable storage medium of claim 21, wherein generating the compliance report further comprises:
   determining when one or more of the plurality of set top boxes switched from a first data stream associated with the first media service to a second data stream associated with the first media service; and
   determining a location of the one or more of the plurality of set top boxes.

* * * * *

UNITED STATES PATENT AND TRADEMARK OFFICE
CERTIFICATE OF CORRECTION

| | | |
|---|---|---|
| PATENT NO. | : 8,352,997 B2 | |
| APPLICATION NO. | : 12/271345 | |
| DATED | : January 8, 2013 | |
| INVENTOR(S) | : Kenneth Ospalik et al. | |

It is certified that error appears in the above-identified patent and that said Letters Patent is hereby corrected as shown below:

In the Claims section, Column 14, Claim 1, Lines 40-41, "complied with the scheduled blackout, wherein the compliance report is generated based on analysis of the" should read --complied with the scheduled blackout, wherein the compliance report is generated based on an analysis of the--.

In the Claims section, Column 15, Claim 8, Lines 13-21, "platform that is distinct from the super headend office; wherein a substitution table associated with the scheduling request is generated at that super headend office; and wherein the substitution table is sent from the super headend office to the at least one set top box via the video head end office, wherein the at least one set top box is to implement the scheduled blackout by utilizing the substitution table that identifies substitution data service based in part on geographic region." should read --platform that is distinct from the super headend office, wherein a substitution table associated with the scheduling request is generated at the super headend office, and wherein the substitution table is sent from the super headend office to the at least one set top box via the video headend office, and wherein the at least one set top box is to implement the scheduled blackout by utilizing the substitution table that identifies substitution data service based in part on a geographic region.--.

In the Claims section, Column 15, Claim 11, Lines 33-34, "event transmission interface; and wherein the method further comprises:" should read --event transmission interface, and the method further comprising:--.

In the Claims section, Column 15, Claim 12, Lines 43-44, "accessing, from the subscriber event transmission interface, a staging flat file at the video head end office that" should read --accessing, from the subscriber event transmission interface, a staging flat file at the video headend office that--.

In the Claims section, Column 15, Claim 12, Lines 52-53, "event, wherein the load ready file has a format compatible with the data warehouse." should read --event, wherein the load ready file has a format compatible with a data warehouse.--.

Signed and Sealed this
Eleventh Day of June, 2013

Teresa Stanek Rea
*Acting Director of the United States Patent and Trademark Office*

CERTIFICATE OF CORRECTION (continued)
U.S. Pat. No. 8,352,997 B2

In the Claims section, Column 16, Claim 13, Line 5, "generated based on analysis of the server blackout event" should read --generated based on an analysis of the server blackout event--.

In the Claims section, Column 16, Claim 18, Line 31, "at least one set top box via the video headend office, wherein" should read --at least one set top box via the video headend office, and wherein--.

In the Claims section, Column 16, Claim 18, Line 34, "data service based in part on geographic region." should read --data service based in part on a geographic region.--.

In the Claims section, Column 17, Claim 21, Line 1, "analysis of the server start event, the server end event," should read --an analysis of the server start event, the server end event,--.

In the Claims section, Column 17, Claim 22, Line 9, "wherein the data staging area is associated with the subscriber" should read --and wherein the data staging area is associated with the subscriber--.

In the Claims section, Column 17, Claim 23, Line 16, "data file to faun a load-ready file having a format compatible" should read --data file to form a load-ready file having a format compatible--.

In the Claims section, Column 18, Claim 24, Lines 1-2, "the plurality of set top boxes was tuned to a first data stream associated with the first media service and was retuned to a" should read --the plurality of set top boxes was tuned from a first data stream associated with the first media service to a--.

In the Claims section, Column 18, Claim 25, Lines 10-11, "the plurality of set top boxes was tuned to a second data stream associated with the first media service and was retuned" should read --the plurality of set top boxes was tuned from a second data stream associated with the first media service--.

In the Claims section, Column 18, Claim 26, Line 21, "determining a location of the one or more of the plurality of" should read --determining a location of each of the one or more of the plurality of--.